United States Patent [19]

Hoopengardner

[11] Patent Number: 5,160,770

[45] Date of Patent: * Nov. 3, 1992

[54] CARPET PADS HAVING PRESSURE SENSITIVE ADHESIVE

[75] Inventor: Merle R. Hoopengardner, Lafayette, Calif.

[73] Assignee: Step Loc Corporation, Lafayette, Calif.

[*] Notice: The portion of the term of this patent subsequent to Dec. 10, 2002 has been disclaimed.

[21] Appl. No.: 243,606

[22] Filed: Sep. 13, 1988

Related U.S. Application Data

[63] Continuation-in-part of Ser. No. 147,214, Jan. 22, 1988, abandoned, which is a continuation of Ser. No. 882,173, Jul. 7, 1986, Pat. No. 4,797,170.

[51] Int. Cl.⁵ ............................................. A61F 13/02
[52] U.S. Cl. ........................................ 428/40; 156/90; 264/DIG. 14; 428/317.3; 428/317.7; 428/318.8; 428/354
[58] Field of Search ............... 428/317.3, 317.7, 354, 428/40, 318.8; 264/DIG. 14; 156/90

[56] References Cited

U.S. PATENT DOCUMENTS

| | | | |
|---|---|---|---|
| 2,292,024 | 8/1942 | Dreher | 428/354 |
| 3,871,948 | 3/1975 | Norris | |
| 4,336,089 | 6/1982 | Asperger | 156/247 |
| 4,421,809 | 12/1983 | Bish et al. | 428/317.3 |
| 4,522,857 | 6/1985 | Higgins | |
| 4,550,986 | 11/1985 | Ledch | 156/71 |
| 4,557,774 | 12/1985 | Hoopengardner | 428/317.3 |
| 4,567,091 | 1/1986 | Spector | 428/318.8 |
| 4,578,300 | 3/1986 | Merlet | |
| 4,584,225 | 4/1986 | Adelman | 428/317.3 |
| 4,647,484 | 3/1987 | Higgins | |
| 4,765,715 | 11/1987 | DeCoste, Jr. et al. | 428/317.3 |
| 4,797,170 | 1/1989 | Hoopengardner | 428/317.7 |

FOREIGN PATENT DOCUMENTS

| | | |
|---|---|---|
| 7124118 | 6/1971 | Fed. Rep. of Germany . |
| 71241184 | 6/1971 | Fed. Rep. of Germany . |
| 926735 | 5/1963 | United Kingdom ............. 428/317.3 |
| 1416684 | 3/1975 | United Kingdom . |

*Primary Examiner*—John J. Gallagher
*Attorney, Agent, or Firm*—Thomas M. Freiburger

[57] ABSTRACT

A carpet pad has pressure sensitive adhesive preapplied on one or both surfaces, for retaining the pad and a carpet in place on a floor by adhesion without the need for stretching. The pad or cushion in one embodiment has a film or sealant on the surfaces of the pad, with pressure sensitive adhesive on at least one of the sealed surfaces for adhering to floor surface or the underside of a carpet. In another embodiment, the pressure sensitive adhesive is a hot melt adhesive, not water-based. The hot melt pressure sensitive adhesive is applied to an uncoated porous padding surface which would be unsuitable for a water-based pressure sensitive adhesive due to excessive wicking-in of such an adhesive. An optional scrim webbing may be applied over the pressure sensitive adhesive, in either embodiment. The scrim webbing adds dimensional stability and also enables the carpet pad to be moved around on a floor or against another surface without sticking, prior to the application of pressure.

9 Claims, 3 Drawing Sheets

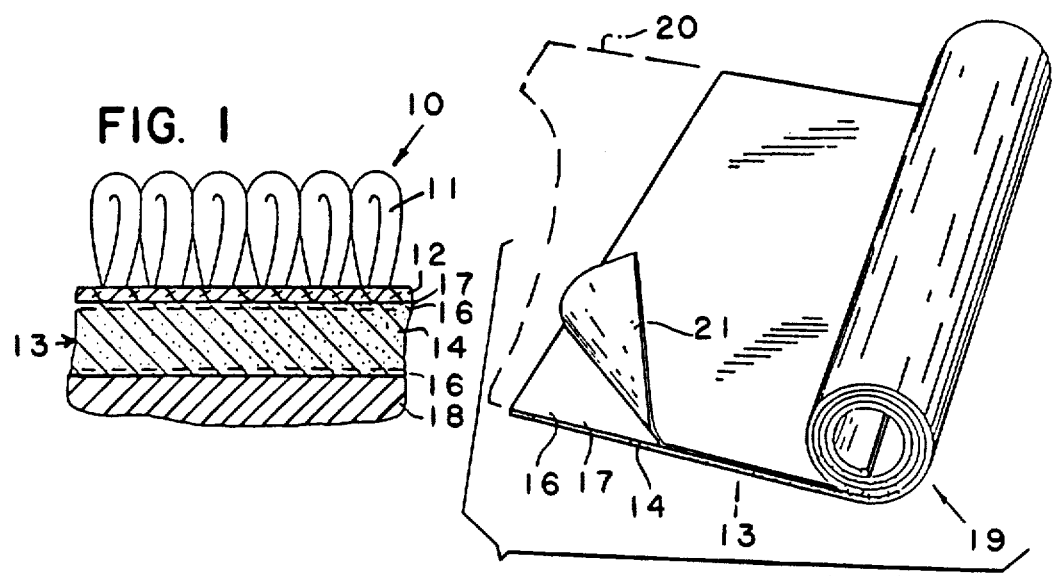
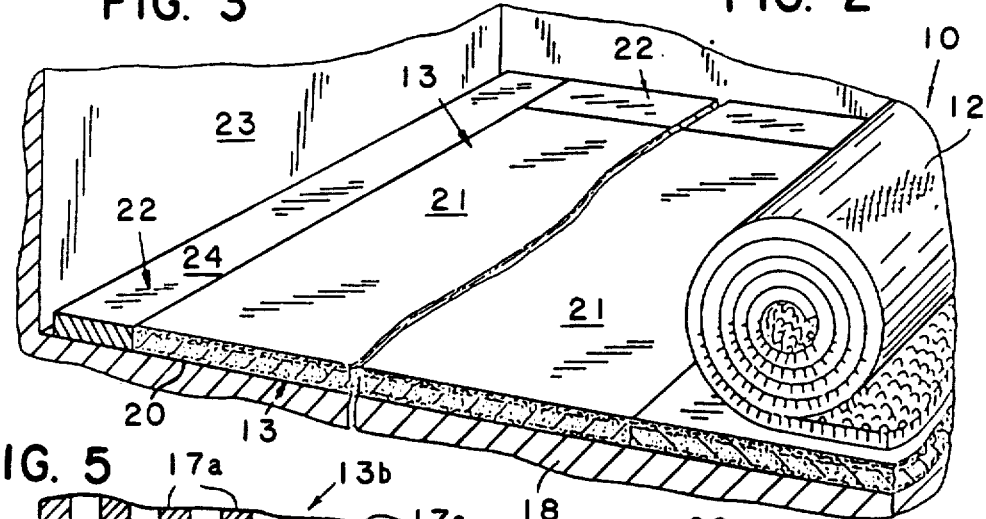
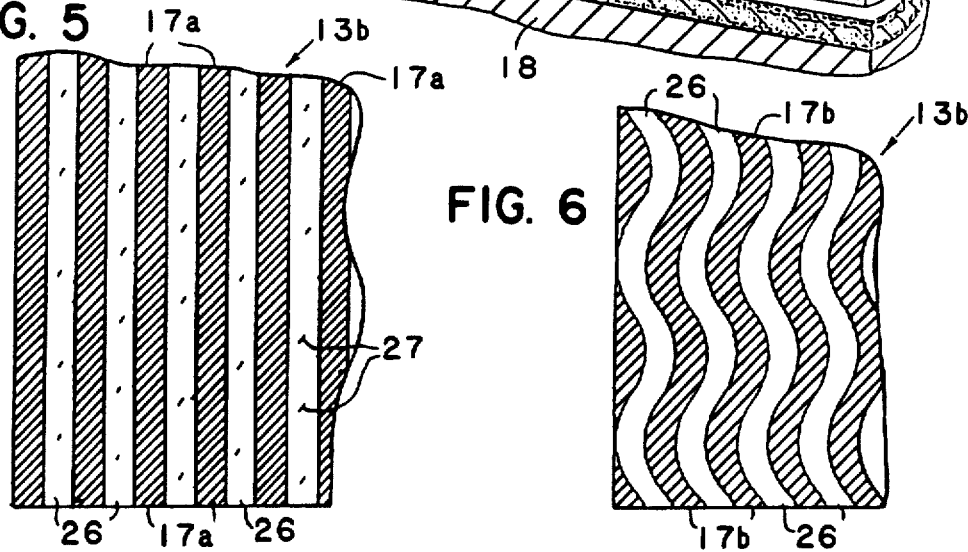

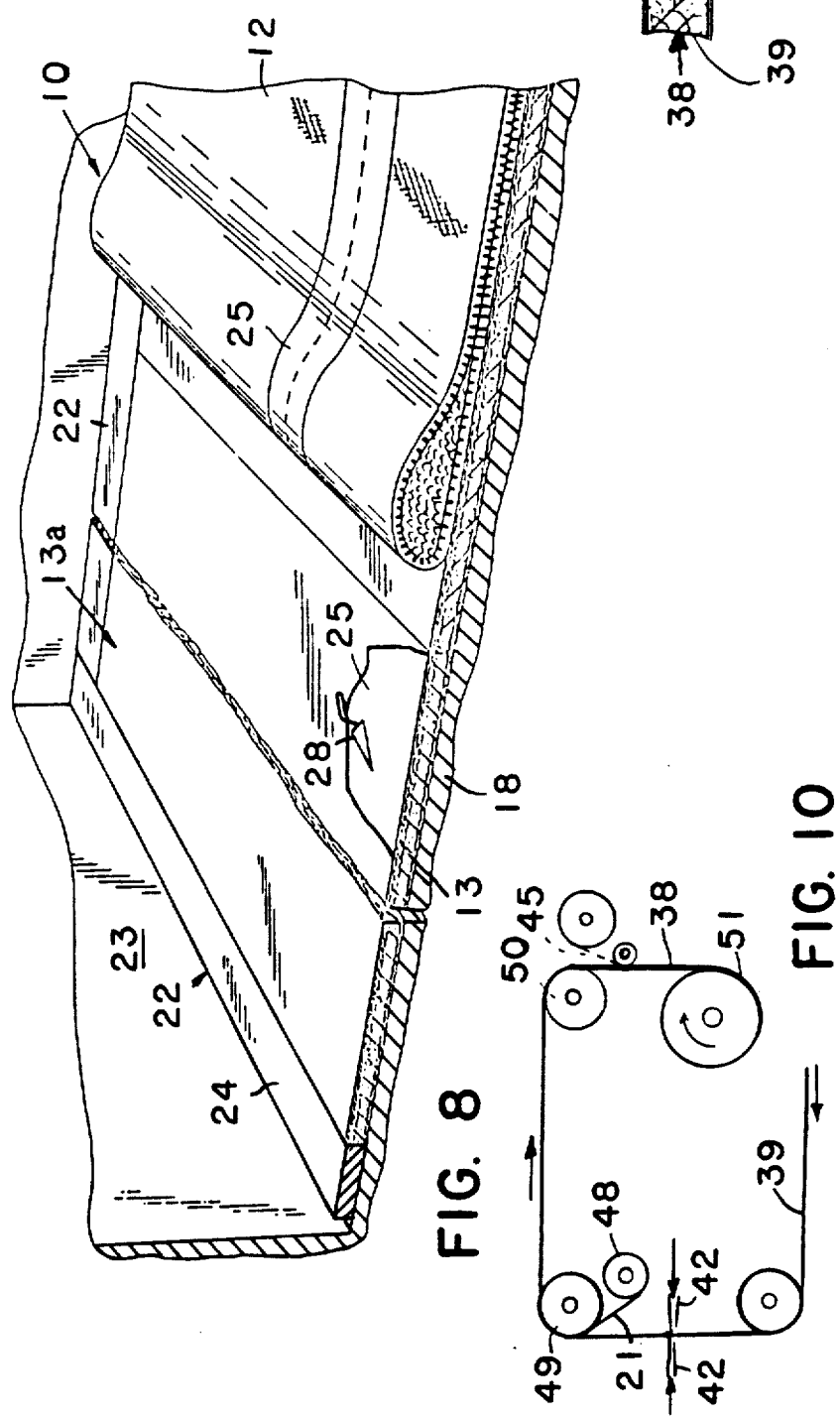

CARPET PADS HAVING PRESSURE SENSITIVE ADHESIVE

REFERENCE TO RELATED APPLICATION

This application is a continuation-in-part of application Ser. No. 147,214, filed Jan. 22, 1988, now abandoned, which was a continuation of application Ser. No. 882,173, filed Jul. 7, 1986, now U.S. Pat. No. 4,797,170.

BACKGROUND OF THE INVENTION

This application relates to a carpet pad and system for holding a carpet in place without stretching. The system is of the general type illustrated and described in U.S. Pat. No. 4,557,774, issued Dec. 10, 1985 to the same inventor and assignee as this application.

The system of the present invention involves a carpet cushion which has a pressure sensitive adhesive preapplied to one surface of the cushion or padding, as opposed to U.S. Pat. No. 4,557,774, which disclosed pressure sensitive adhesives preapplied to both surfaces. U.S. Pat. No. 4,557,774 is hereby incorporated in this disclosure by reference.

The present invention also relates to carpet pads or cushions having a hot melt pressure sensitive adhesive applied to an otherwise uncoated and unsealed porous padding surface which would be unsuitable for a water based pressure sensitive adhesive. On such porous surfaces, water based adhesives tend to wick excessively into unsealed porous surfaces.

Conventionally, carpeting has been installed on floors in several different ways. In the conventional tackless strip system, the so-called tackless strip is secured to the floor around the walls of the room, the carpet is hooked onto the upwardly protruding nails of the tackless strip at one side of the room, and the carpet is stretched before it is hooked to the tackless strip at the opposite side of the room. One problem with this system is that it requires the installation of the tackless strip, which is time-consuming and which is difficult when concrete floors are encountered. Another problem is that it requires a trained professional to re-stretch the carpet in the event a corner or edge portion of the carpet needs to be temporarily taken up, access to the floor or for drying a carpet which has been wetted.

Many carpet installations involve gluing of the carpeting to the floor, without any carpet cushion or pad between the carpet and the floor. With such an installation, the carpeting can be of less expensive construction, with a primary backing but without the need for a secondary backing (jute or polypropylene backing) which is generally required for stretched carpeting. The glued down carpeting avoids wrinkling without the need for stretching, but loses the benefit of a carpet pad. Also, the carpet can be very difficult to remove either for replacement or temporarily, for maintenance, without destroying the floor or the carpeting itself due to the adhesion of the glue.

In glue-down installations, the carpet is ordinarily laid on the floor first and seamed as required. The glue is then applied to the floor, either in liquid form or by spraying it onto the floor. This can be accomplished by folding back half of the carpet, applying the glue to the floor in that area, and dropping the carpet in place to adhere it to the floor in that area. The opposite side of the carpet could then be folded back, glue applied to the floor in that area, and that portion of the carpet then adhered to the floor.

Another installation system wherein the carpet was adhered to the floor without padding is disclosed in U.S. Pat. No. 4,405,668 to Wald. This system used a separate, thin scrim web with adhesive on both sides and with a release film on one side. The scrim web was placed on a floor with the release film on the upper surface, adhering the web to the floor, whereupon the carpet could then be seamed and cut as required while lying on top of the release film. The carpet was then folded back and the release film removed in one area, that portion of the carpet was pressed down, and the operation was repeated in another area. This system was relatively expensive and still did not permit the installation of a carpet pad beneath the carpeting. A similar construction of adhesive webbing material is shown in U.S. Pat. No. 4,234,649 to Ward.

In yet another system for installing carpet without stretching, a slab or pad of jute material was interposed between the carpet backing and the floor. In this particular system the floor was sprayed with a wet adhesive, the slab of jute material was laid into the adhesive while the adhesive was still wet, the top surface of the jute material was sprayed with the wet adhesive, and the carpet was laid on the wet adhesive on the top surface of the jute slab or pad. The wet adhesive, as it dried, became enough of a pressure sensitive adhesive to permit the carpet to be pulled up and removed.

This system had the disadvantage of being an expensive system because of the costs required to make an on-the-job installation.

As noted above, U.S. Pat. No. 4,557,774 illustrates and discloses a carpet cushion and carpet-laying system similar to some aspects of the present invention, the principal difference being that in some embodiments of the present invention the cushion has a pressure-sensitive adhesive preapplied to only one surface.

Water based pressure sensitive adhesives when applied to a carpet cushion are liquid, and will wick excessively into any porous surface such as the porous surface of an untreated felt pad or rebonded urethane pad or of a porous remay which has often been used over a carpet cushion surface. Consequently, some type of surface sealing is required for the use of such adhesives, examples being a thin plastic skin adhered to the porous surface, or a sprayed-on sealant, or a crust formed at the surface to seal the pad, as by heating. The need for such sealing is avoided in one aspect of the present invention described below.

SUMMARY OF THE INVENTION

It is a primary object of the present invention to hold carpet in place without stretching by a system that avoids the problems of the prior art.

It is a closely related object to hold the carpet in place by a system that utilizes a pad with pressure sensitive adhesive which is preapplied to one of the surfaces of the pad, with further adhesive applied on the job, to the floor or the upper surface of the pad, depending on which way the pad is used.

Another object, in a preferred embodiment, is the provision of a carpet cushion having hot melt pressure sensitive adhesive preapplied on one or both surfaces, with the cushion surfaces being porous and unsuitable for water based pressure sensitive adhesives in the absence of surface sealants.

By the method of the present invention, carpeting is efficiently and economically installed without stretching or the need for tackless strips, but still with the benefit of a carpet cushion or pad between the floor and the carpet.

In use of the one-sided adhesive coated carpet cushion of the invention, first there is positioned on the floor surface a carpet cushion having a pressure-sensitive adhesive on one of its upper and lower surfaces. The preapplied adhesive may be down, against the floor, or up, for contacting and holding the carpet in place, with a release film adhered to the adhesive on the upper surface. If the adhesive side is up, an adhesive may be first applied to the floor, as by troweling, spraying or rolling, before the cushion is laid down.

The carpet cushion or pad is of generally conventional width and length for a carpet pad, wide enough and long enough to allow its use for installation of wall-to-wall carpet in a practical manner.

The carpet cushion need not include any significant stiffener, since the adhesion to the floor will provide needed dimensional stability.

When the cushion has been laid and trimmed as required, the carpet is positioned on top of the release film (if the adhesive side is up) on the carpet cushion, and rough cut and seamed as required. The carpet is then folded back to expose a portion of the carpet cushion, usually one half, and the release film is removed from the exposed cushion.

The carpet is then pressed down onto the exposed pressure-sensitive adhesive on the upper surface of the carpet cushion, and another portion of the carpet is folded back and the release film is removed from that area of the carpet cushion. That portion of the carpet is then pressed down.

If the adhesive side of the cushion is down, there is no need for a release film and the carpet can be seamed and rough cut on the cushion's upper surface by sections, with the carpet folded back as described above.

When all areas of the carpet are in contact with the adhesive, final trimming of the carpet edges is performed.

The described method may include installing rigid spacer strips on the floor along the walls of the room before laying the carpet cushion, preferably strips of wood or plastic with pressure-sensitive adhesive on both sides. The purpose of the spacer strips is to provide an edge similar to that of the tackless strips, since the carpet installer's trimming tools have been designed to trim the carpet with the hard strip present, cutting the carpet ¼ inch long and tucking the carpet edge under, against the wall or baseboard. If a tackless strip from a previous carpet installation is present, it may be left in place with no need for the spacer strips.

In the manufacture of the carpet cushion, if a water-based pressure sensitive adhesive is used, sealing means preferably are applied to both surfaces of the pad, which may be a foam material, to substantially seal the surface before the pressure-sensitive adhesive is added. This keeps the adhesive at the surface of the foam or other material and prevents wicking-in. The sealing means may comprise a thin corona treated or flame treated plastic skin adhered to each surface at the pad in the manufacturing process. Alternatively, it may comprise a liquid sealant applied to the surfaces, or simply a crust formed at both the lower and upper surfaces of the foam cushion. A crust can be formed by a heat process, or by a curing process wherein increased density occurs at the surfaces. A dense crust can eliminate the need for further sealing at the surfaces of the foam.

The adhesive need not cover the entire surface of the carpet cushion, but may be in spaced strips. Adhesive cost is thereby reduced without adversely affecting the positional stability of the carpet installation. Also, this enables the carpet cushion to be stapled or tacked to the floor, if needed in particular areas, in the spaces between strips of adhesive when the adhesive is on the upper surface. The carpet will then bridge the gap over the recess or dimple caused by the stapling, since there is no adhesive in this area.

The adhesive on the cushion's surfaces may be applied over the entire area or it may be in parallel serpentine strips to discourage wrinkling of the carpet, which tends to occur in straight lines.

The system of the invention enables the use of less expensive carpeting than usually required in stretch-/tackless strip installations. The typical stretched carpet includes an upper surface yarn, extending through a primary backing such as a polypropylene mesh, with a secondary backing of a jute or polypropylene mesh for dimensional stability in the stretching operation.

With the present system of adhesive bonding of the carpet to the pad and the pad to the floor, the carpet does not need an expensive secondary backing, since it is adhered down in substantially all areas and is not stretched.

In the manufacture of carpet cushions according to the invention using a hot melt pressure sensitive adhesive, sealing means are not required on the surface or surfaces of the porous pad prior to application of the adhesive. Further, the padding material may comprise inexpensive scrap materials of natural or synthetic material. This can include felt or synthetic felt or rebonded urethane scraps, all of which have extremely porous surfaces which would cause excessive wicking-in of a water based pressure sensitive adhesive.

The porous carpet pad is formed in sheet-like form, in such thickness, density and compressibility to serve as a carpet cushion. Onto this sheet of carpet padding is applied a hot melt pressure sensitive adhesive, on at least one surface. The hot melt pressure sensitive adhesive is applied at a somewhat elevated temperature, above the flow point temperature of the hot melt pressure sensitive adhesive. Immediately upon coming into contact with the porous surface of the carpet cushion sheet, the hot melt pressure sensitive adhesive lies substantially entirely on the surface, adhering strongly to the extremity of the porous surface in a non-flowable state. The adhesive does not appreciably wick into the porous carpet pad surface.

The hot melt pressure sensitive adhesive may be applied as described to both surfaces of the carpet pad. Optionally, a scrim webbing may be applied over the hot melt pressure sensitive adhesive layer. The scrim adheres to the adhesive but tends to space the adhesive slightly away from a floor or other surface, so that the carpet pad with the adhesive does not appreciably adhere to the floor until deliberate pressure is applied. The scrim webbing also adds dimensional stability, needed with certain carpet cushion materials.

It is therefore among the objects of the invention to improve on prior carpeting installation systems and carpet pads by providing a carpet cushion or pad having pressure sensitive on at least one surface, for adhering to the floor or the carpet to the upper surface of the cushion with adhesive applied on the job for the other surface, avoiding the need for stretching or relatively expensive carpeting which includes a secondary backing. A related object is the provision of a carpet cushion with preapplied hot melt pressure sensitive adhesive, on a padding material which is very porous and unsealed and which may be formed of inexpensive scrap materials, greatly reducing the cost of the carpet cushion. The hot melt pressure sensitive adhesive may be applied to one or both sides of the cushion.

Other objects, advantages and features of the invention will be apparent from the following description of preferred embodiments, considered along with accompanying drawings.

DESCRIPTION OF THE DRAWINGS

FIG. 1 is a fragmentary sectional view showing a carpet and pad installed with the carpet pad of the invention.

FIG. 2 is a perspective view showing a carpet pad according to the invention and comprising a part of the installation shown in FIG. 1. The pad is shown coming off a roll, with a release film covering one side of the adhesive coated pad on the inside of the roll, in accordance with one embodiment of the invention.

FIG. 3 is a perspective view showing a floor in preparation for carpet installation according to the invention, with the pad laid on the floor and the carpet being unrolled on top of the pad.

FIG. 5 is a plan view showing a pad according to the invention with its pressure-sensitive adhesive applied in parallel strips rather than over the entire surface of the pad, and showing optional stapling between the strips of adhesive.

FIG. 6 is a plan view similar to FIG. 4, but showing the adhesive applied in serpentine strips.

FIG. 8 is a view like FIG. 4 but showing the cushion installed with the adhesive side down. An adhesive is then applied to the upper side of the cushion prior to engaging the carpet back to that side of the cushion. The adhesive is applied by troweling in FIG. 8.

FIG. 9 is a fragmentary sectional view showing a carpet cushion in accordance with another embodiment of the present invention, with hot melt pressure sensitive adhesive applied to one or both sides.

FIG. 10 is a schematic view indicating a method of manufacturing a carpet cushion having hot melt pressure sensitive adhesive on one or both sides.

DESCRIPTION OF PREFERRED EMBODIMENTS

Figure 4:
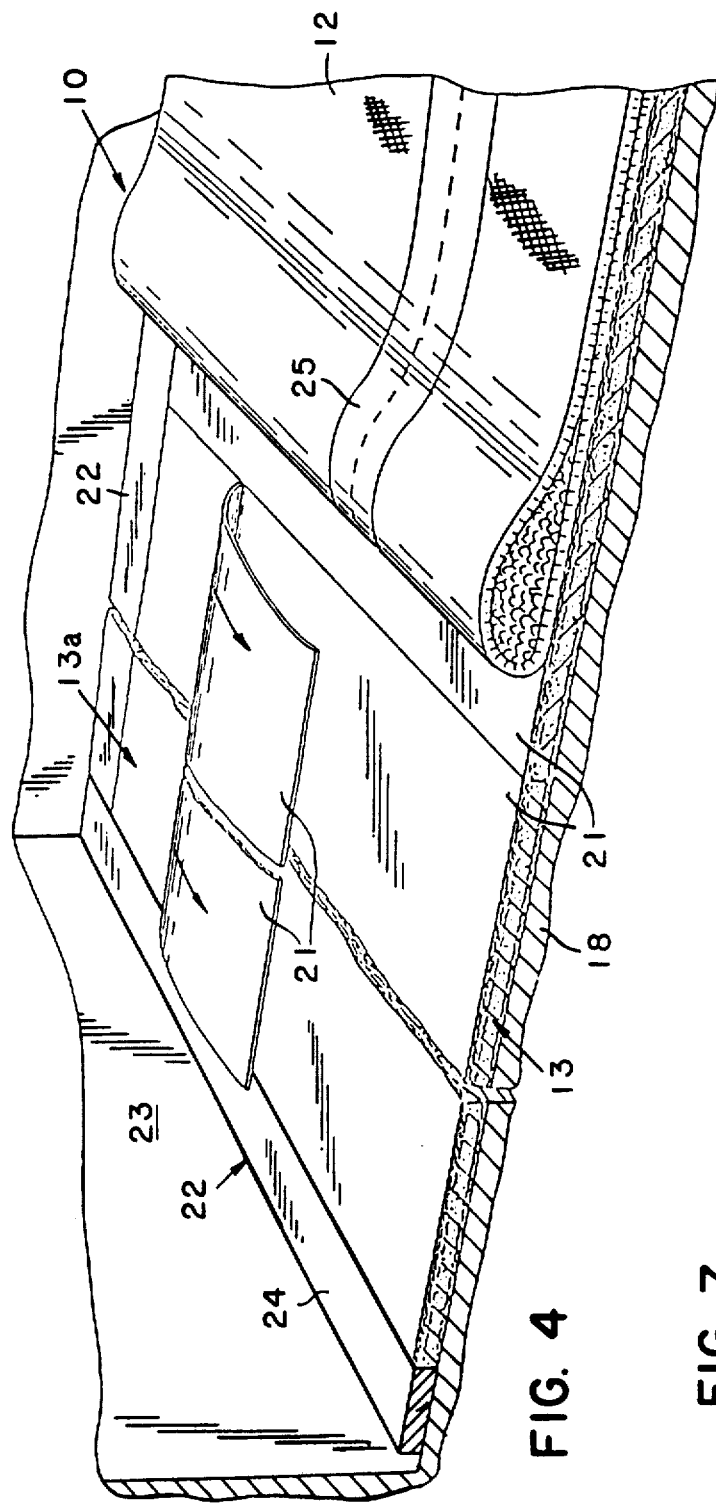
FIG. 4 is a perspective view similar to FIG. 3, but showing the carpet pulled back for peeling away the release film from the top surface of the pad, in a portion of the floor where the carpet, already seamed and cut, has been pulled or rolled back. In this embodiment of the system of the invention the cushion is installed with adhesive side up for contacting the underside of the carpet.

In the drawings, FIG. 1 shows a carpet 10 with a pile 11 and a single backing layer or primary backing 12 laid on a pad or carpet cushion 13 comprising a pad 14 which may be of foam material, with a skin, crust or sealant 16 on both surfaces of the pad and a pressure-sensitive adhesive layer 17 on one of the top and bottom surfaces of the pad 14, applied to the skin, crust or sealant 16. In accordance with the invention the skin, crust or sealant 16 may be eliminated when a hot melt pressure sensitive is used, on one or both surfaces. This is discussed further below.

In FIG. 1 the adhesive layer is shown on the upper surface of the pad 13. In this embodiment the adhesive 17 holds the carpet backing 12 to the carpet cushion 13. If the adhesive surface is down, on the other hand, it holds the carpet cushion to the surface of the floor 18 below. Installation steps with respect to these two orientations of the carpet cushion 13 are described further below.

FIG. 2 shows a roll 19 of the carpet cushion 13 of the invention, showing the pad 14 (which may be urethane, rubber or felt) and the upper sealed surface 16. The roll 19 of carpet cushion is of generally conventional width and length for a carpet pad, being sufficiently wide and having sufficient length to allow its use for installation of wall-to-wall carpet in a practice manner. The adhesive layer 17 is shown on the upper surface as the cushion 13 will be unrolled, although it can be on the lower surface. A release film 21 of a sheet plastic material is shown overlying the upper surface of the carpet cushion 13, i.e., the inner surface of the cushion on the roll 19, being temporarily adhered to that surface. The bottom of the cushion 13, and thus the outer surface of the roll 19 as seen in FIG. 2, need not be covered by any release film, unless the adhesive side is outside, in which case an outer cover is used until the roll reaches the job site.

The release film (covering the pressure sensitive adhesive the upper surface of the padding as shown in FIG. 2) enables the cushion to be laid on a floor and adhered to the floor while still leaving the upper surface usable as a work surface for unrolling the carpet 10 and performing preliminary cutting and seaming operations as necessary. For storage and transport of the roll 19 prior to installation, the release film may have a tail or extension 20 (dashed lines) which wraps around the roll and covers the exposed adhesive.

FIG. 3 illustrates some aspects of the installation operation according to the system of the invention. First, rigid spacer strips 22 may be installed around the edges of the room near the walls 23. The spacer strips 22 may be of wood or plastic, for example, with a pressure-sensitive adhesive 24 either preapplied onto both the upper and lower surfaces of the strips or applied on the job to both the upper and lower surfaces. The purpose of the strip 22 is merely to take the place of the conventional tackless strips, in the sense that conventional carpeting tools for trimming the finished carpet have been designed to be used along the edges of the tackless strips. If tackless strips are in place from a prior carpet installation, they can be left intact, and the spacer strips 22 would then not be needed.

It should also be understood that the carpet installation according to the invention may be performed without the use of any spacer strips 22 or tackless strips provided the installer uses tools adequate to properly trim the carpet without the presence of the usual rigid strip.

If the floor surface is dusty, a floor primer can be used to lock the dust particles to the floor, creating a better bonding surface.

The carpet cushion 13 is unrolled onto the floor along the spacer strips 22, which are of about the same thickness as the cushion, generally in the manner shown in FIG. 2.

FIG. 3 shows the adhesive carpet cushion 13 laid and trimmed on the floor 18, with its lower side adhered to the floor 18.

If the preapplied pressure sensitive adhesive side is up, as illustrated in FIG. 3, a suitable layer of glue (pressure-sensitive or non-pressure sensitive adhesive) 20 is applied to the floor surface, as by troweling, spraying or rolling before the cushion 13 is unrolled onto the floor.

After the cushion has been laid and trimmed, the release film 21 is left in place on the upper surface as shown in FIG. 3.

The carpet 10 is then unrolled over the top of the release film, and seaming and preliminary cutting are performed as necessary.

With the carpet seamed (carpet seaming is indicated at 25) and rough cut it is then folded back or rolled back as indicated in FIG. 4 to expose a portion 13a of the cushion. This enables the release film 21 to be peeled off the upper surface of that portion of the cushion 13a as indicated in FIG. 4. Once this is accomplished, the carpet is put back into position on the sticky upper surface of the cushion portion 13a; and the same operation is then repeated with another portion of the carpet 10 which may be the other half of the room. That is, the carpet is pulled or folded or rolled back to expose another portion of the remainder of the carpet cushion and its release film 21 is peeled off. Then the remaining portion of the carpeting is moved back into position, until all areas of the carpet are in contact with the upper surface of the carpet cushion, and final trimming operations are conducted.

If, on the other hand, the preapplied adhesive surface is laid down against the floor, then a similar operation is performed with respect to pulling back portions of the carpet, but there is no release film 21 to remove since there is no preapplied adhesive on the upper side of the cushion. Therefore, when a section of carpet is pulled back a pressure-sensitive or non-pressure sensitive adhesive is applied to the cushion by spraying or troweling. The adhesive may be a water based pressure sensitive (e.g. acrylic) or a hot melt pressure sensitive adhesive, or any other suitable adhesive. FIG. 8 shows such an adhesive 25 being applied to the upper surface of the cushion using a trowel 28.

In one aspect of the invention, the adhesives used in some embodiments of the carpet cushion and method of the invention are water based, and may comprise an acrylic water based adhesive which loses its tackiness when wetted but regains tackiness upon drying. For example, the adhesive may be the product Flexcryl 1625 marketed by Air Products Company. Both the preapplied adhesive and the adhesive added on the job can comprise this type of adhesive. One advantage of this type of adhesive is its ability to regain its tackiness after being over soaked with water. In this sense, the adhesive is non-permanent and allows for temporary lifting of the carpet when desired.

Once the carpet and cushion dry, the carpet re-gains its tackiness and the carpet can be pressed into the adhesive.

The invention enables a less expensive water base latex non-pressure sensitive type adhesive or a multi-purpose adhesive to be used on the job site, either trowelled or rolled on the floor or upper surface of the cushion.

FIG. 5 shows a carpet cushion 13b according to the invention, with spaced strips of adhesive 17a upon the surface, separated by spaces 26 on the surface which have no adhesive. This saves on the amount of adhesive required while still providing for adequate adhesion of the carpet cushion 13b to the floor or the carpet backing. Also, when the adhesive is up, it enables staples 27 or tacks to be used to hold the carpet cushion 13b down to the floor if required under special circumstances, without causing the carpet to recess or "dimple" inwardly at the location of the staple. Dimpling is avoided because there is no adhesive in the immediate vicinity of each staple 27, so the carpet does not adhere into the recess in the cushion caused by the staple, but rather the carpet bridges across the recess.

FIG. 6 shows a serpentine pattern for adhesive strips 17b on a carpet cushion 13b, which may be desired to prevent a pattern of wrinkling in the installed carpet. Wrinkles tend to occur in straight lines, so that the serpentine pattern shown in FIG. 6 discourages the occurrence of wrinkles.

Figure 7:
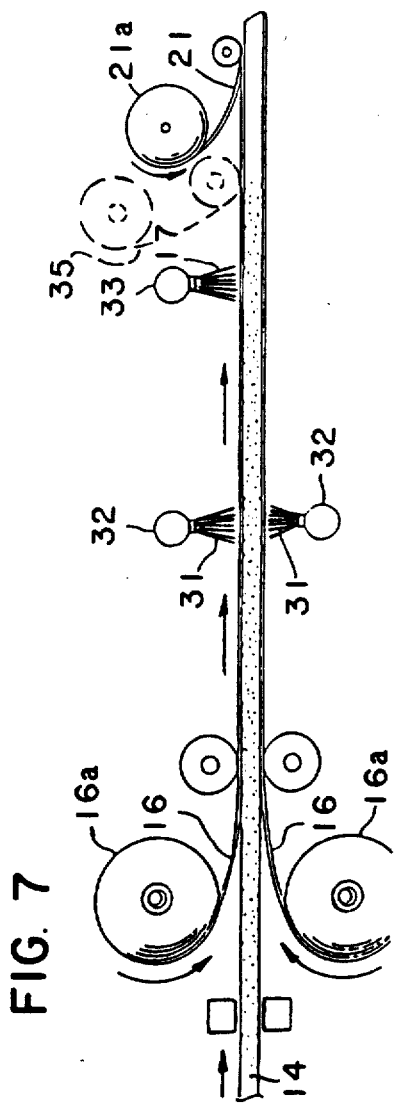
FIG. 7 is a schematic view indicating a method for producing the carpet pad of the invention.

As indicated in FIG. 7, in the manufacture of the adhesive carpet cushion 13, a very thin plastic film or skin may be bonded to or formed on both sides of the foam sheet 14 in the manufacturing process, to form the sealing surface 16 described above. The skin 16 may be bonded to the surfaces of the pad 14 by a corona-heat bonding process, so that it is fused into the surfaces of the pad during the manufacturing process (as by a hot roller), or it may be bonded by other suitable means such as adhesives. A skin or crust may be formed (as an integral part of the cushion) as part of the forming process of manufacturing a foamed cushion. It may be formed by heat applied to a foam surface. Alternatively, a sealant 31 may be applied in lieu of the plastic skin, or integral crust, as by liquid application or spraying by spray nozzles 32 on both surfaces of the pad. In either event, the surfaces are sealed to substantially close the porosity of the foam at the surfaces.

Next, a pressure sensitive adhesive 17, either hot melt or water based, is applied to at least one surface, as by sprayers 33 (or by rollers, not shown), and the adhesive does not penetrate into the foam. The prior application of the sealing means prevents this, in the case of a water based adhesive, but it should be understood that the sealing means can be eliminated if a hot melt pressure sensitive adhesive is used. In either event, the adhesive is sufficiently strong to adhere and bond the carpet and/or pad in position without stretching.

As mentioned above, the sealing means, if needed, may alternatively comprise a crust of substantially increased density in the surfaces of the foam pad, formed by heat, the manner of curing of the foam, or other suitable means.

The release film 21 may next be applied to one side of the carpet cushion 13, temporarily bonding to the adhesive on that side. Preferably, all of these operations are accomplished in a continuous process wherein the foam 14, sealing film 16 and release film 21 are advanced off roll stock 16a and 21a as schematically indicated in FIG. 7. The sealant and adhesive are applied at appropriate points in the operation, and the final product emerges complete and is stored in rolls 19 similar to that shown in FIG. 2. If the sealing film 16 is heated by a hot roller on application (for good bonding), roller temperature is critical. If heated to too high a temperature the skin will develop pinholes. Choice of skin materials is important—some skins will better withstand heat.

A scrim webbing 35 (dashed lines) may be applied over the adhesive layer 17, if desired. As discussed above, the scrim webbing adds further dimensional stability and also spaces the adhesive 17 slightly away from the floor or carpet backing, so that the cushion (or the carpet) may be more easily moved around before tacking it down by pressure. The scrim must be open enough, and of sufficiently fine filaments, that the pad will bond to the floor (or carpet backing) when pressure is applied. A minimum of about ¼ opening size, and a fine filament size, should be used so that the scrim does not hold the adhesive too strongly away from the floor. The scrim opening size and filament size depend to some extent on the pad's surface coarseness, with coarser pads not requiring as fine a filament size or as large openings.

The cushion or padding 13 can also be made from materials other than integrally formed foam. For example, the cushion may be made from rebonded urethane, rubber or felted needle punched synthetic with sealed surfaces on the top and bottom, in the event water based pressure sensitive adhesive is used.

As discussed above, another very important aspect of the present invention is a carpet cushion or pad of the general type described, but specifically with a hot melt pressure sensitive adhesive applied to one or both sides of an otherwise porous pad surface. FIG. 9 shows schematically such a carpet cushion 38. The cushion 38 may be formed of a sheet of carpet padding material 39 which is of low cost materials and with porous surfaces, such as would not generally be practicable for use with a water based pressure sensitive adhesive unless a surface sealing means were applied, as discussed above. In this embodiment, the porous surfaces of the pad 39 preferably are left porous, without any treatment for sealing them. A hot melt pressure sensitive adhesive 41 is applied to one or both sides of the porous pad 39. Due to the nature of the hot melt pressure sensitive, it can be applied either by spraying or by extruding onto the surfaces, and it will adhere to the porous surfaces in a non-flowable state, such that it cannot wick into the cushion 39 to any appreciable degree. Sealing means such as liquid sealants or plastic skins or heat formed crusts may be used prior to application of the adhesive if desired, but they are not necessary.

The material of the sheet of carpet padding 39 may comprise inexpensive rebonded urethane scraps, for example, or it may comprise a natural or synthetic felt or cotton material or rubber. The pad 39 may comprise a urethane or other foam material to which has been applied a remay, a fuzzy layer which is usually intended to hold an adhesive (e.g. a spun-bonded non-woven nylon or polyester). Even in the presence of a relatively thick remay covering, the hot melt pressure sensitive adhesive 41 will not appreciably wick into the remay and can be used very efficiently in producing the carpet cushion 38. The hot melt pressure sensitive adhesive remains in a semi-solid, nonflowable state, and it is aggressively tacky when pressed into contact with a floor or carpet padding or other surface.

The hot melt pressure sensitive adhesive may be of several types, such as a non-permanent, semi-permanent or permanent adhesive, such as manufactured by Fuller Corporation.

As shown in the schematic diagram of FIG. 10, the hot melt pressure sensitive adhesive material 41 may be applied to the carpet padding sheet or base 39 by extruding it (extruders 42) onto the surface or surfaces (or it can be applied by spraying). As discussed above in connection with FIG. 7, a scrim webbing 45 (dashed lines) may be applied to one or both surfaces, on top of the hot melt pressure sensitive adhesive. This can add dimensional stability, particularly in the case of inexpensive felt-like materials or urethane materials which are otherwise not very dimensionally stable. It also helps in manipulation of the carpet pad 38 during the installation procedure, in allowing it to slide around against other surfaces without significant sticking, due to the scrim webbing's spacing of the adhesive away from the surface to which it will ultimately adhere. Again, as discussed above, the filament size and opening size of the scrim must be selected (depending on the coarseness of the pad surface) to permit good bonding of the pad to the floor (or carpet).

FIG. 10 also shows an arrangement wherein a release film 21 is applied from a roll 48 to one side of the cushion, onto the hot melt pressure sensitive adhesive on that side. The release film 21 thus enables the cushion 38 to pass over rollers 49 and 50, enroute to a storage roll 51 for the completed cushion assembly 38.

The hot melt pressure sensitive adhesive may also be advantageously applied to the padding material 39 by spraying. It may be sprayed onto the surfaces using hot melt spray equipment such as manufactured by Slautterback Corporation of Monterey, Calif. Such adhesive may have a flow point of about 300° F., although the specific flow point temperature is not as important as the feature that the adhesive be essentially non-flowable and aggressively tacky at room temperature and moderately above room temperature, and that it be capable of cooling quickly to such state upon contacting the porous surface. Hot melt pressure sensitive adhesives are available in a wide range of flow point temperatures.

As an alternative to the adhesive application methods discussed above and indicated in FIG. 10, the hot melt pressure sensitive adhesive may be applied to the pad surface by transfer coating. By this process, the hot melt pressure sensitive adhesive is first applied to a release film (such as the release film 21), then the film is applied to the pad sheet such that the adhesive contacts the pad surface. When removed, the release film leaves the adhesive on the pad surface.

It should be understood that the carpet pads of the invention, in the various forms described above, can be used to lay a new carpet over an existing carpet, without removal of the existing carpet. The carpet cushion of the invention, for example the two-sided hot melt pressure sensitive adhesive-coated cushion such as shown in FIG. 9, may be laid on top of the surface of the existing carpeting. New carpet may then be installed on the upper surface of the carpet cushion 38. Such an installation saves greatly on installation time and cost, and provides further cushioning for the carpet.

The carpet pad of the invention may also form a part of a combination carpet/pad product wherein the pad is permanently adhered to the underside of a carpet, for combined installation. The hot melt pressure sensitive adhesive is on the bottom surface of the pad or cushion.

The above described preferred embodiments are intended to illustrate the principles of the present invention, but not to limit its scope. Other embodiments and variations to these preferred embodiments will be apparent to those skilled in the art and may be made without departing from scope of the invention as defined by the following claims.

I claim:

1. A carpet pad for installation between a floor and a wall-to-wall carpet, for retaining the carpet and pad in place by adhesion without need for stretching, comprising:
- a pad with upper and lower surfaces and of such thickness, density and compressibility as to enable it to serve as a carpet padding;
- the pad being of generally conventional width and length for a carpet pad, wide enough and long enough to allow its use for installation of wall-to-wall carpet in a practical manner;
- means for sealing both surfaces of the pad; and
- pressure-sensitive adhesive means on only one surface of the pad, for adhering and bonding said one surface of the pad to a surface of a floor or to the underside of a carpet, for holding the carpet and pad in position without stretching while allowing for temporary lifting of the carpet wholly or in localized areas when desired,
- the adhesive means being placed over the sealing means.

2. The carpet pad of claim 1, further including a removable release film on said one surface of the pad, to facilitate roll storage and for manipulating a carpet on the laid pad, before adhering the carpet to the pad.

3. The carpet pad of claim 1, wherein the sealing means comprises a thin plastic film or skin adhered to each surface of the pad, with the adhesive applied to the skin.

4. The carpet pad of claim 1, wherein the sealing means comprises a sealant applied to both surfaces of the pad.

5. The carpet pad of claim 1, wherein the pad is of urethane foam, and wherein the sealing means comprises a crust formed on the surfaces of the pad in the production of the foam pad.

6. The carpet pad of claim 1, wherein the pressure-sensitive adhesive is in spaced strips on the surface of the pad.

7. The carpet pad of claim 1, wherein the pad is formed of rebonded urethane foam.

8. The carpet pad of claim 1, wherein the pressure-sensitive adhesive comprises an acrylic water based adhesive.

9. A carpet pad for installation between a floor and a wall-to-wall carpet, for retaining the wall-to-wall carpet and pad in place by adhesion without need for stretching, comprising:
- a pad with upper and lower surfaces and of such thickness, density and compressibility as to enable it to serve as a carpet padding; and
- the pad being of generally conventional width and length for a carpet pad, wide enough and long enough to allow its used for installation of wall-to-wall carpet in a practical manner;
- pressure-sensitive adhesive means on only one surface of the pad for adhering to a surface of a floor or the underside of a carpet, for adhering to a surface of a floor or the underside of a carpet, for adhering and bonding the carpet and pad in position without stretching;
- and including means for preventing wicking-in of the adhesive into the pad to any significant degree on application of the adhesive, said adhesive means being ever the means for preventing wicking-in.

* * * * *

UNITED STATES PATENT AND TRADEMARK OFFICE
CERTIFICATE OF CORRECTION

PATENT NO. : 5,160,770
DATED : November 3, 1992
INVENTOR(S) : Merle R. Hoopengardner It is certified that error appears in the above-indentified patent and that said Letters Patent is hereby corrected as shown below:

Claim 9, column 12, line 20: "used" should be --use--.

Claim 9, column 12, lines 24-25: Delete "for adhering to a surface of a floor or the underside of a carpet".

Claim 9, column 12, line 31: "ever" should be --over--.

Signed and Sealed this

Fourth Day of July, 1995

Attest:

BRUCE LEHMAN

*Attesting Officer*  *Commissioner of Patents and Trademarks*